(12) United States Patent
Lin

(10) Patent No.: US 8,108,019 B2
(45) Date of Patent: Jan. 31, 2012

(54) SLIDING HINGE

(75) Inventor: Ming-Han Lin, Tu-Cheng (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 443 days.

(21) Appl. No.: 12/423,015

(22) Filed: Apr. 14, 2009

(65) Prior Publication Data

US 2010/0257699 A1  Oct. 14, 2010

(51) Int. Cl.
*H04M 1/00* (2006.01)
(52) U.S. Cl. .............. 455/575.4; 455/575.1; 455/575.2; 455/575.3
(58) Field of Classification Search .... 455/575.1–575.4, 455/90.3, 128; 16/281, 284, 296, 86.2, 308, 16/327, 355; 248/309.1–316.8; 312/7.1
See application file for complete search history.

(56) References Cited

U.S. PATENT DOCUMENTS

| | | | |
|---|---|---|---|
| 7,646,866 B2 * | 1/2010 | Lin et al. ................. | 379/433.12 |
| 2008/0028572 A1 * | 2/2008 | Lee et al. ........................ | 16/221 |
| 2010/0029348 A1 * | 2/2010 | Lee et al. .................. | 455/575.4 |
| 2010/0058883 A1 * | 3/2010 | Zhang et al. .................... | 74/1 R |
| 2011/0086683 A1 * | 4/2011 | Kfoury ...................... | 455/575.4 |

* cited by examiner

*Primary Examiner* — Jean Gelin
*Assistant Examiner* — Nathan Taylor

(57) ABSTRACT

A sliding hinge includes a base body, a sliding body slidably coupled with the base body, and a pushing component placed between the base body and the sliding body and having a torsion spring and a swinging arm. The torsion spring has a first elastic arm with a free end thereof pivotably connected to the base body, and a second elastic arm. The swinging arm defines a first end pivotably connected to the base body and a second end pivotably connected with a free end of the second elastic arm, and has a portion adjacent to the first end pivotably connected with the sliding body. The sliding body is pushed to bring the swinging arm to oscillate so that the second elastic arm can approach the first elastic arm for storing an elastic force which will be subsequently released to drive the swinging arm to make the sliding body slide automatically.

10 Claims, 6 Drawing Sheets

SLIDING HINGE

BACKGROUND OF THE INVENTION

1. Field of the Invention

The present invention relates to a hinge, and more particularly to a sliding hinge mainly applied in a sliding type electronic device.

2. The Related Art

An electronic device, such as a cellular phone, an electronic dictionary, and the like, is designed to have two parts slidable relatively via a sliding hinge for reducing the volume and enlarging the image display area thereof. Generally, a sliding hinge 10 in prior art, shown in FIG. 6, includes a base body 11, a sliding body 13 slidably coupled with the base body 11 and a torsion spring 14 placed between the base body 11 and the sliding body 13. The torsion spring 14 has a first elastic arm 141 and a second elastic arm 142. A free end of the first elastic arm 141 is pivotably connected to the base body 11. A free end of the second elastic arm 142 is pivotably connected to the sliding body 13. The sliding body 13 is firstly pushed to make the torsion spring 14 deform and then driven to move forwards automatically by a stored elastic force of the torsion spring 14 releasing. However, such structure needs to push the sliding body 13 to slide a predetermined distance until the deformation of the torsion spring 14 is maximized. The travel distance of the sliding body 13 is longer, which is not perfectible for a user to use and reduces the sliding stability of the electronic device.

SUMMARY OF THE INVENTION

Accordingly, an object of the present invention is to provide a sliding hinge capable of reducing the travel distance between two relatively sliding parts of a sliding type electronic device. The sliding hinge includes a base body, a sliding body slidably coupled with the base body, and a pushing component placed between the base body and the sliding body and having a torsion spring and a swinging arm. The torsion spring has a first elastic arm and a second elastic arm. A free end of the first elastic arm is pivotably connected to the base body. The swinging arm defines a first end pivotably connected to the base body and a second end opposite to the first end pivotably connected with a free end of the second elastic arm, and has a portion adjacent to the first end pivotably connected with the sliding body. The sliding body is pushed to bring the swinging arm to oscillate so that the second elastic arm can approach the first elastic arm gradually for storing an elastic force which will be subsequently released to drive the swinging arm to keep on oscillating to make the sliding body slide automatically.

As described above, when the sliding type electronic device is opened or closed, the sliding body is pushed by a user to make the swinging arm oscillate so that the torsion spring is deformed to store the elastic force, and then the stored elastic force is released to drive the swinging arm to make the sliding type electronic device open or closed automatically. In this process, since the swinging arm is connected between the torsion spring and the sliding body, as a lever and, furthermore, the pivotal position between the sliding body and the swinging arm is adjacent to the first end of the swinging arm, which reduces the sliding distance of the sliding body without affecting the motion of the torsion spring, enhancing the hi-tech quality of the sliding type electronic device.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
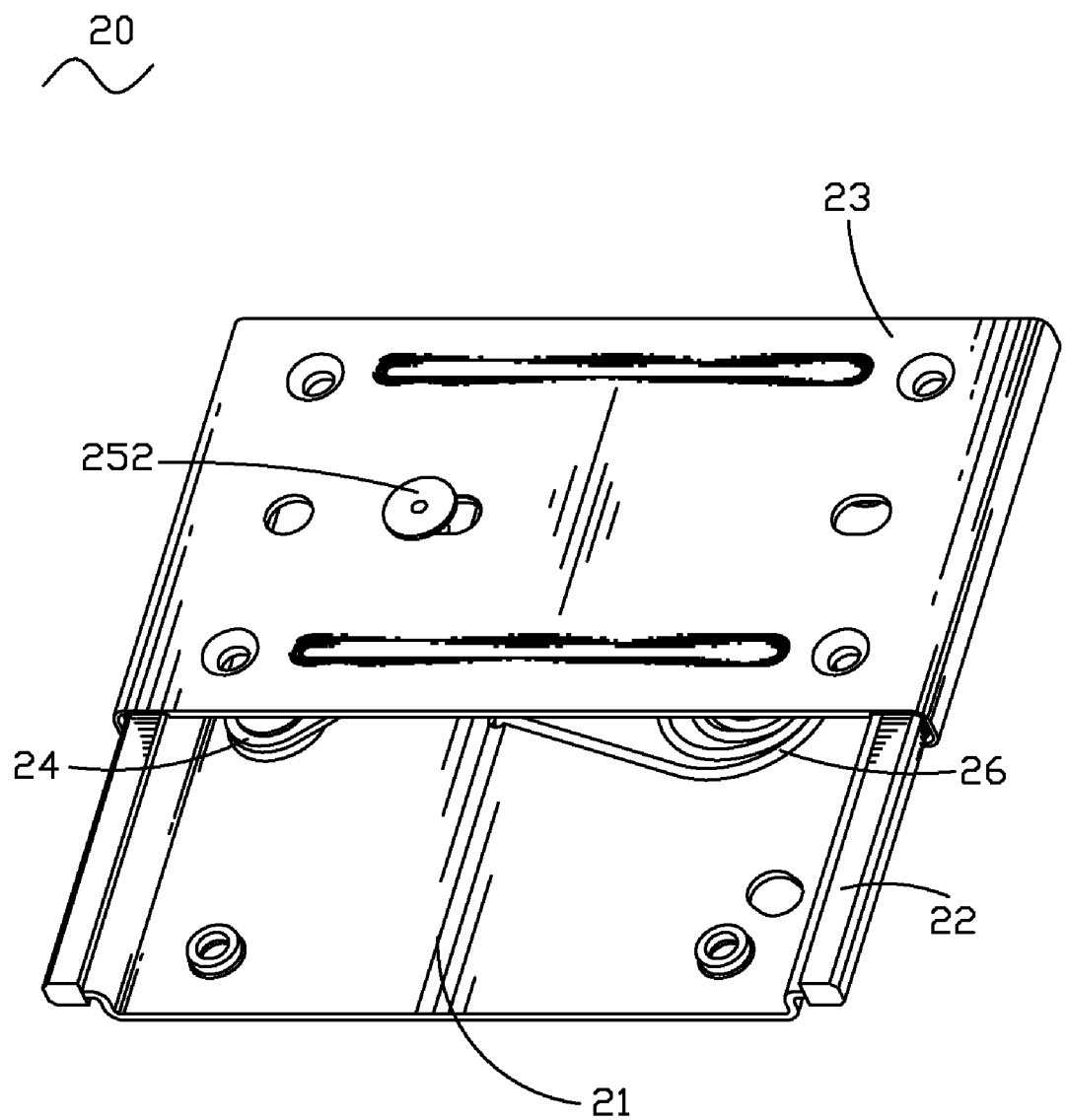
FIG. 1 is an assembled, perspective view of a sliding hinge of an embodiment according to the present invention.
Figure 2:
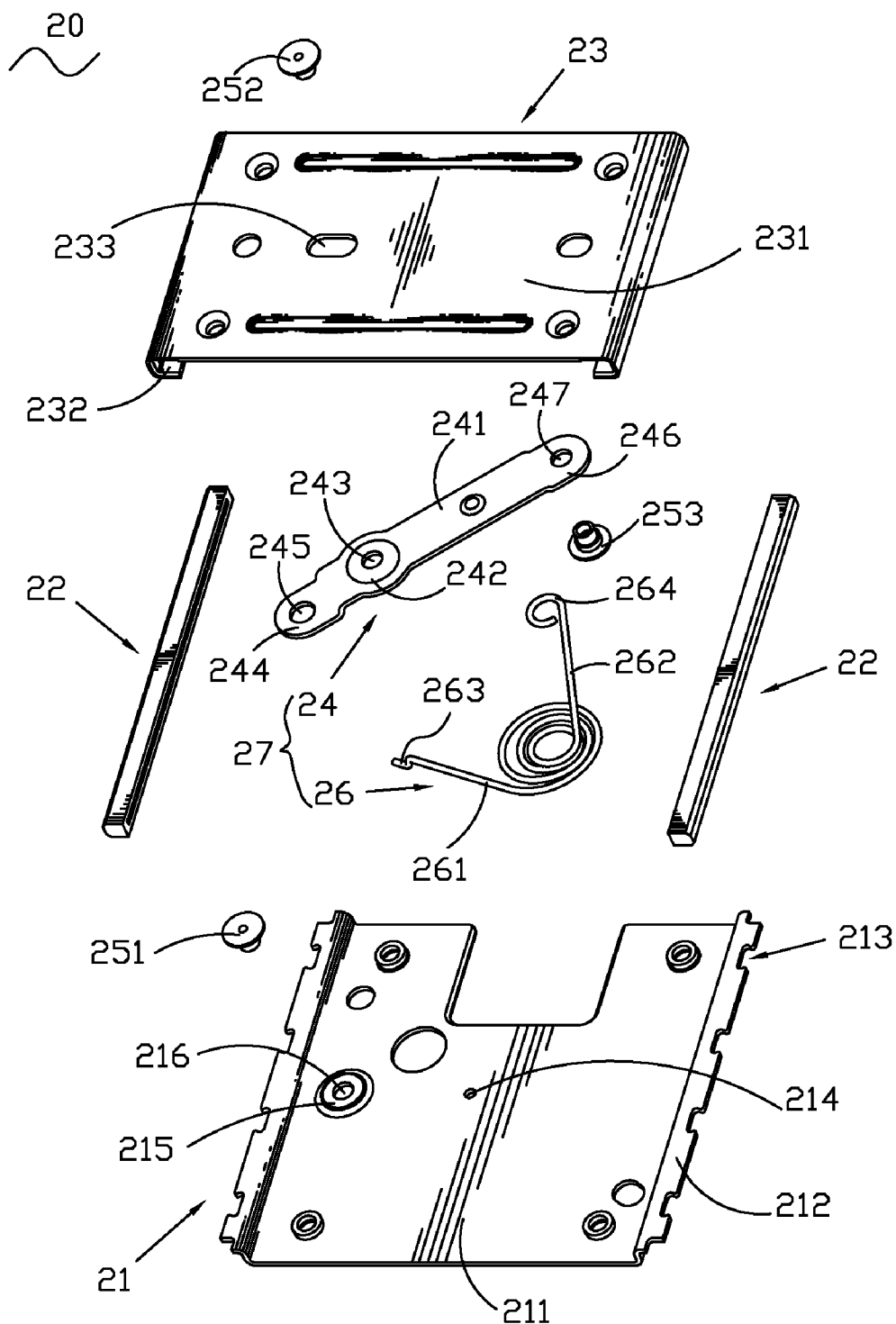
FIG. 2 is an exploded, perspective view of the sliding hinge shown in FIG. 1.

With reference to FIG. 1 and FIG. 2, a sliding hinge 20 of an embodiment according to the present invention includes a base body 21 fixed to a lower housing of a sliding type electronic device (not shown), a sliding body 23 slidably coupling with the base body 21 fixed to an upper housing of the sliding type electronic device, and a pushing component 27 placed between the base body 21 and the sliding body 23.

The base body 21 has a base plate 211 of rectangular shape. Two sides of the base plate 211 extend upwards and bend outwards to form two lateral portions 212. Each of the lateral portions 212 has a plurality of indentations 213. The base plate 211 has a first protruding portion 215 at a middle portion thereof in a longitudinal direction and near one of the lateral portions 212, and a first hole 214 at a substantially center thereof. The first protruding portion 215 is of circle shape and has a second hole 216 in alignment with the first hole 214.

Figure 3:
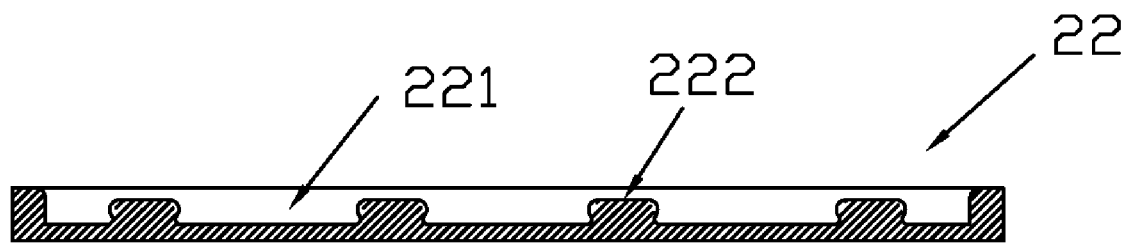
FIG. 3 is a cross-sectional view of a sliding element of the sliding hinge shown in FIG. 2.

Referring to FIG. 2 and FIG. 3, the sliding body 23 has a sliding plate 231 of rectangular shape. Two opposite sides of the sliding plate 231 extend downwards and bend inwards to form two buckling portions 232. The sliding plate 231 has a stopping hole 233 extending transversely to show an elliptical shape and located at a middle thereof in a longitudinal direction and biased from a middle portion thereof in a transverse direction.

The sliding hinge 20 further has two sliding elements 22. The sliding element 22 is a bar shape and has a receiving groove 221 at an inner side thereof for receiving the lateral portion 212. A bottom of the receiving groove 221 is protruded outwards to form a plurality of lumps 222 corresponding to the indentations 213 for fixing the sliding element 22 to the base plate 211. The sliding body 23 is slidably coupled with the base body 21 by the buckling portions 232 enclosing and sliding on the corresponding sliding elements 22.

Please reference to FIGS. 1-2 again, the pushing component 27 includes a torsion spring 26 and a swinging arm 24. The torsion spring 26 has a first elastic arm 261 and a second elastic arm 262. A free end of the first elastic arm 261 is extended downwards and bent back to the first elastic arm 261 to form a fixing portion 263, showing an L shape. A free end of the second elastic arm 262 is curled to form a fixing ring 264.

The swinging arm 24 may be manufactured by a metal plate to show a substantial strip shape and defines a main portion 241. Two ends of the main portion 241 are extended downwards and bent opposite to the main portion 241 to form a first end 244 and a second end 246, respectively. The first end 244 and the second end 246 are both parallel to the main portion 241 and have a first fixing hole 245 and a second fixing hole 247, respectively. The main portion 241 has a portion protruding upwards to form a second protruding portion 242 adjacent to the first end 244 with a predetermined distance. A pivotal hole 243 is formed on the second protruding portion 242, corresponding to the stopping hole 233.

Referring to FIG. 2 and FIG. 3, in assembly, the fixing portion 263 of the first elastic arm 261 is inserted into the first hole 214 of the base body 21, and the second elastic arm 262 is pivotally connected with the second end 246 of the swinging arm 24 by a fixing element 253 inserted into the fixing ring 264 and the second fixing hole 247. The first end 244 of the swinging arm 24 is placed on the first protruding portion 215 and pivoted with the base plate 211 by a fixing element 251 inserted into the first fixing hole 245 and the second hole 216. A fixing element 252 is adapted for passing through the stopping hole 233 and the pivotal hole 243 for pivotally connecting with the sliding body 23 and the swinging arm 24.

Figure 4:
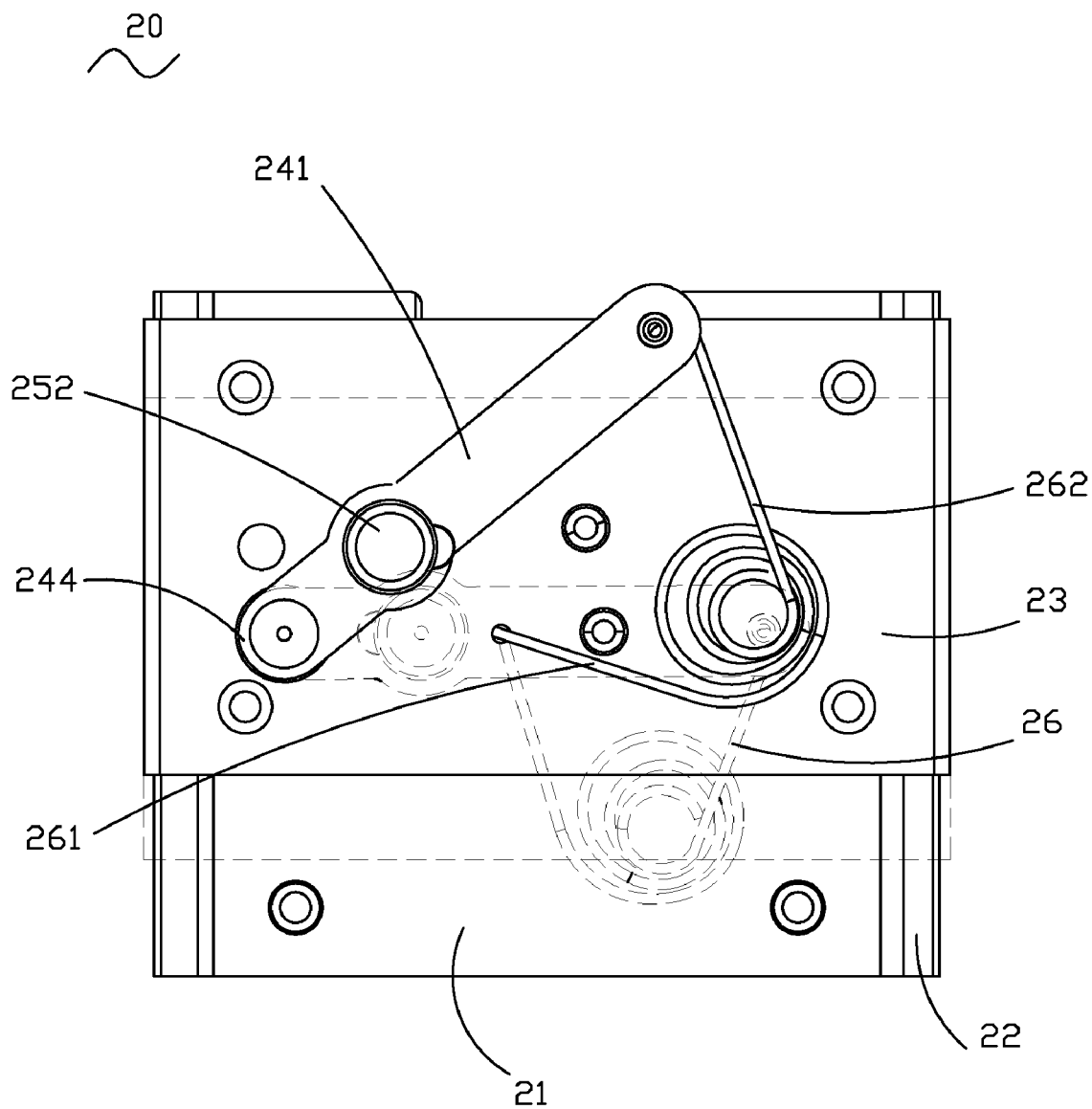
FIG. 4 is a plan view showing an operation process of the sliding hinge shown in FIG. 1 from a close status to a middle status in which a torsion spring has a maximum deformation.
Figure 5:
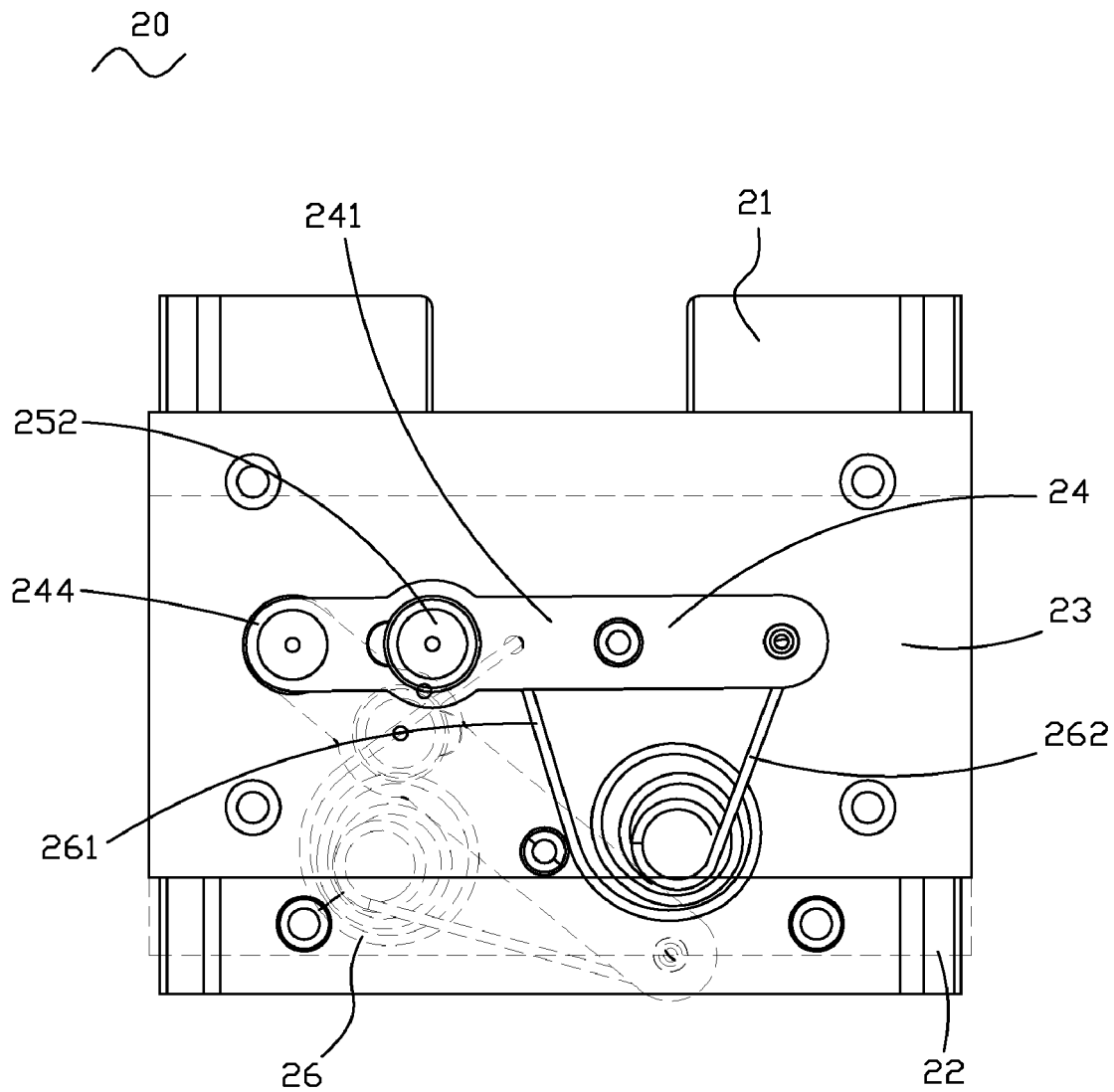
FIG. 5 is a plan view showing an operation process of the sliding hinge shown in FIG. 1 from the middle status to an opening status.
Figure 6:
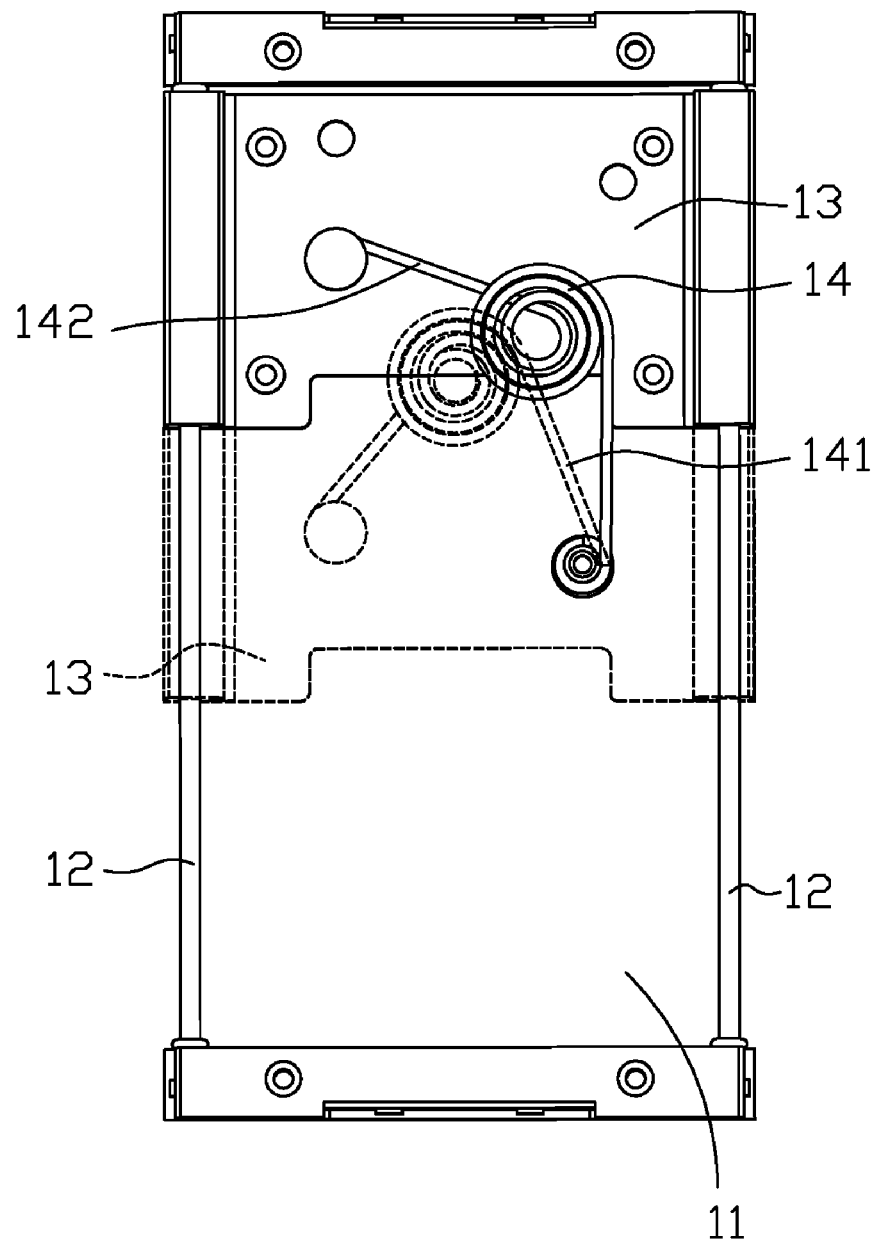
FIG. 6 is a plan perspective view of a sliding hinge according to the prior art.

Please reference to FIG. 4 and FIG. 5, when the sliding type electronic device with the sliding hinge 20 is in the close status, the fixing element 252 is disposed to lean at one end of the stopping hole 233 adjacent to the first end 244. As a user pushes the upper housing with respect to the lower housing to open the sliding type electronic device, a certain level of the external force is applied from the user to the upper housing and brings the sliding body 23 to slide forwards along the sliding elements 22, which drives the swinging arm 24 to oscillate forwards by the fixing element 252. As a result, the fixing portion 263 and the fixing ring 264 approach each other gradually, and the fixing element 252 gradually moves toward the other end of the stopping hole 233. At this process, a stored elastic force of the torsion spring 26 is increased gradually until reaching maximum when the swinging arm 24 is disposed levelly. At this time, although the user does not push the upper housing, the fixing ring 264 continues moving forwards away from the fixing portion 263 gradually by the stored elastic force of the torsion spring 26 releasing. In this process, the swinging arm 24 keeps on oscillating forwards and brings the sliding body 23 to move forwards by the fixing element 252, and the fixing element 252 gradually moves back to return to the original position. Thus the sliding type electronic device can be opened semi-automatically. The closed process of the sliding type electronic device with the sliding hinge 20 is operated substantially same as described above.

As described above, either the sliding type electronic device is opened or closed, the sliding body 23 will be pushed by the user to make the swinging arm 24 oscillate forwards so that the torsion spring 26 can deform to store the elastic force, and then the stored elastic force will be released to drive the swinging arm 24 to make the sliding type electronic device open or closed automatically. In this process, since the swinging arm 24 is connected between the torsion spring 26 and the sliding body 23, as a lever and, furthermore, the pivotal position between the sliding body 23 and the swinging arm 24 is adjacent to the first end 244 of the swinging arm 24, which will reduce the sliding distance of the sliding body 23 without affecting the motion of the torsion spring 26, enhancing the hi-tech quality of the sliding type electronic device.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A sliding hinge, comprising:
    a base body having a first hole at a substantial center thereof and a second hole in alignment with the first hole and adjacent to a side thereof;
    a sliding body slidably coupled with the base body; and
    a pushing component placed between the base body and the sliding body including a torsion spring and a swinging arm, the torsion spring having a first elastic arm and a second elastic arm, a free end of the first elastic arm being pivotably connected to the first hole of the base body, the swinging arm defining a first end pivotably connected to the second hole of the base body and a second end opposite to the first end pivotably connected with a free end of the second elastic arm, and having a portion adjacent to the first end pivotably connected with the sliding body,
    wherein the free end of the first elastic arm is extended downwards and bent back to the first elastic arm to form a fixing portion of L shape and mounted in the first hole of the base body, and the sliding body is pushed to bring the swinging arm to oscillate so that the second elastic arm can approach the first elastic arm gradually for storing an elastic force which will be subsequently released to drive the swinging arm to keep on oscillating to make the sliding body slide automatically.

2. The sliding hinge as claimed in claim 1, wherein the swinging arm has a pivotal hole adjacent to the first end, and the sliding body has an elliptical stopping hole extending perpendicular to a sliding direction of the sliding body for being pivotally connected with the pivotal hole by a fixing element.

3. The sliding hinge as claimed in claim 2, wherein the swinging arm has a protruding portion of circle shape near the first end, the pivotal hole is formed on the protruding portion.

4. The sliding hinge as claimed in claim 1, wherein the first end of the swinging arm has a first fixing hole, and the swinging arm is pivoted to the base body by a fixing element inserted into the first fixing hole and the second hole.

5. The sliding hinge as claimed in claim 1, wherein the swinging arm has a main portion of strip shape, and two opposite ends of the main portion are extended downwards and bent opposite to the main portion to form the first end and the second end.

6. The sliding hinge as claimed in claim 1, further comprising a pair of sliding elements respectively fixed to two opposite sides of the base body, the sliding body being mounted to and slid on the sliding elements.

7. The sliding hinge as claimed in claim 6, wherein the base body has a base plate, two opposite sides of the base plate are extended upwards and bent outwards to form lateral portions, each of the lateral portions has a plurality of indentations, each of the sliding elements has a receiving groove corresponding to one of the lateral portions and a plurality of lumps formed at a bottom thereof and received in the corresponding indentations of the lateral portion for fixing the sliding element to the base body.

8. The sliding hinge as claimed in claim 6, wherein the sliding element is a bar shape, the sliding body has a sliding plate suspended above the base body, two opposite sides of the sliding plate extend downwards and bend inwards to form buckling portions enclosing and sliding on the corresponding sliding elements.

9. A sliding hinge, comprising:
- a base body having a base plate, two opposite sides of the base plate being extended upwards and bent outwards to form lateral portions, each of the lateral portions having a plurality of indentations;
- a pair of sliding elements respectively fixed to two opposite sides of the base body, each of the sliding elements having a receiving groove corresponding to one of the lateral portions and a plurality of lumps formed at a bottom thereof and received in the corresponding indentations of the lateral portion for fixing the sliding element to the base body;
- a sliding body mounted to and slid on the sliding elements, and slidably coupled with the base body; and
- a pushing component placed between the base body and the sliding body including a torsion spring and a swinging arm, the torsion spring having a first elastic arm and a second elastic arm, a free end of the first elastic arm being pivotably connected to the base body, the swinging arm defining a first end pivotably connected to the base body and a second end opposite to the first end pivotably connected with a free end of the second elastic arm, and having a portion adjacent to the first end pivotably connected with the sliding body,
- wherein the sliding body is pushed to bring the swinging arm to oscillate so that the second elastic arm can approach the first elastic arm gradually for storing an elastic force which will be subsequently released to drive the swinging arm to keep on oscillating to make the sliding body slide automatically.

10. The sliding hinge as claimed in claim 9, wherein the sliding element is a bar shape, the sliding body has a sliding plate suspended above the base body, two opposite sides of the sliding plate extend downwards and bend inwards to form buckling portions enclosing and sliding on the corresponding sliding elements.

\* \* \* \* \*